(12) United States Patent
Omori (10) Patent No.: US 9,366,286 B2
(45) Date of Patent: Jun. 14, 2016

(54) RADIAL FOIL BEARING

(71) Applicant: IHI Corporation, Tokyo (JP)

(72) Inventor: Naomichi Omori, Tokyo (JP)

(73) Assignee: IHI CORPORATION (JP)

( * ) Notice: Subject to any disclaimer, the term of this patent is extended or adjusted under 35 U.S.C. 154(b) by 0 days.

(21) Appl. No.: 14/496,322

(22) Filed: Sep. 25, 2014

(65) Prior Publication Data

US 2015/0030269 A1 Jan. 29, 2015

Related U.S. Application Data

(63) Continuation of application No. PCT/JP2013/059292, filed on Mar. 28, 2013.

(30) Foreign Application Priority Data

Apr. 6, 2012 (JP) ................................. 2012-087325

(51) Int. Cl.
F16C 32/06 (2006.01)
F16C 17/02 (2006.01)
F16C 43/02 (2006.01)

(52) U.S. Cl.
CPC ........... *F16C 17/024* (2013.01); *F16C 32/0603* (2013.01); *F16C 43/02* (2013.01)

(58) Field of Classification Search
CPC ........ F16C 17/02; F16C 17/024; F16C 17/24; F16C 32/0603; F16C 32/0607; F16C 33/08; F16C 43/02; F16C 226/70; F16C 226/76
See application file for complete search history.

(56) References Cited

U.S. PATENT DOCUMENTS

| 5,634,723 | A | 6/1997 | Agrawal | 384/106 |
| 6,261,002 | B1 | 7/2001 | Ermilov | 384/105 |
| 8,845,193 | B2 * | 9/2014 | Omori | 384/103 |
| 8,944,687 | B2 * | 2/2015 | Omori | 384/103 |
| 2002/0054718 | A1 | 5/2002 | Weissert | 384/104 |
| 2002/0106138 | A1 | 8/2002 | Akizuki | 384/106 |

FOREIGN PATENT DOCUMENTS

| CN | 1249020 A | 3/2000 |
| JP | 2002-061645 | 2/2002 |
| JP | 2002-364643 | 12/2002 |
| JP | 2003-056561 | 2/2003 |
| JP | 2003-074550 | 3/2003 |
| JP | 2004-190762 | 7/2004 |
| JP | 2004-270904 | 9/2004 |
| JP | 2006-057652 | 3/2006 |

(Continued)

OTHER PUBLICATIONS

International Search Report and Written Opinion mailed Jul. 2, 2013 in corresponding PCT International Application No. PCT/JP2013/059292.

(Continued)

*Primary Examiner* — James Pilkington
(74) *Attorney, Agent, or Firm* — Ostrolenk Faber LLP (57) ABSTRACT

A radial foil bearing (3) that supports a rotating shaft (1). This radial foil bearing (3) is provided with a top foil (10), a back foil (11), and a bearing housing (12) that houses them. A through-slot (13) is formed in the inner circumferential surface of the bearing housing (12), and engagement slots (20) are formed in the through-slot (13) by a fixing tool (16).

6 Claims, 8 Drawing Sheets

(56) References Cited

FOREIGN PATENT DOCUMENTS

| | | |
|---|---|---|
| JP | 2006-057828 | 3/2006 |
| JP | 2009-281213 | 12/2009 |
| JP | 2009-299748 | 12/2009 |
| JP | 2010-230735 | 10/2010 |
| JP | 2013-024344 | 2/2013 |
| JP | 2013-100885 | 5/2013 |
| WO | WO 2011/025087 A1 | 3/2011 |

OTHER PUBLICATIONS

Korean Notice of Allowance, dated Nov. 10, 2015, issued in corresponding Korean Patent Application No. 10-2014-7025514. English translation. Total 3 pages.

Japanese Notice of Allowance, dated Nov. 24, 2015, issued in corresponding Japanese Patent Application No. 2012-087325. English translation. Total 6 pages.

* cited by examiner

RADIAL FOIL BEARING

CROSS-REFERENCE TO RELATED APPLICATIONS

This application is a Continuation of International Application No. PCT/JP2013/059292, filed on Mar. 28, 2013, claiming priority based on Japanese Patent Application No. 2012-087325, filed Apr. 6, 2012, the content of which is incorporated herein by reference in their entity.

BACKGROUND OF THE INVENTION

1. Field of the Invention

The present invention relates to a radial foil bearing.

2. Description of Related Art

Conventionally, a radial bearing that is used by being fitted on a rotating shaft is known as a bearing for a high-speed rotating body. As this kind of radial bearing, a radial foil bearing is well known that is provided with a thin plate-shaped top foil that forms the bearing surface, a back foil that resiliently supports the top foil, and a cylindrical bearing housing that houses the top foil and the back foil. As the back foil of the radial foil bearing, a bump foil that consists of a thin plate molded in a corrugated shape is chiefly used.

In the case of this kind of radial foil bearing, in order to prevent the top foil and the bump foil from dropping out of the bearing housing, normally one end portion thereof (toe portion) is directly fixed to the bearing housing via spot welding or indirectly fixed via a spacer.

Also, in Patent Document 1, both ends of the top foil are locked and fixed by respectively being made to butt against stop walls of the internal wall of a housing.

[Patent Document 1] Japanese Unexamined Patent Application, First Publication No. 2006-57828
[Patent Document 2] Japanese Unexamined Patent Application, First Publication No. 2006-57652
[Patent Document 3] Japanese Unexamined Patent Application, First Publication No. 2004-270904
[Patent Document 4] Japanese Unexamined Patent Application, First Publication No. 2009-299748

However, when welding the top foil, it is highly likely that strain will be produced in the top foil due to the heat input. Also, while there is known one that performs a bending process on one end portion (toe portion) of the top foil to perform mechanical fixing as a substitute for welding, in that case, strain ends up being produced in the top foil by the bending process. Moreover, since both ends of the top foil are butted against the stop wall in Patent Document 1, a reaction force is applied from both end portions of the top foil toward the center portion, resulting in strain being produced.

However, the lubricating fluid film of the foil bearing that is formed between the rotating shaft and the top foil due to the rotation of the rotating shaft is extremely thin at around 10 micrometers. For this reason, even a little strain in the top foil affects the load capability and the dynamic characteristics (rigidity and attenuation) of the bearing, and so the as-designed performance is no longer obtained.

Also, in the case of a common top foil in which one end portion (toe portion) is fixed to the bearing housing by spot welding, the vicinity of both ends (the toe end side and free end side) enters a plane-like state that is hindered from adapting to the curved surface that constitutes the inner circumferential surface of the bearing housing. Thereby, a force that constricts the rotating shaft (local preload) is produced at the section close to the plane. As a result, problems arise such as the starting torque increasing, and the heat generation during operation of the rotating shaft becoming higher than the setting.

Also, since strain is produced in the top foil by the reaction force in Patent Document 1, the top foil ends up becoming a shape close to square that partially has planar portions due to the strain, instead of a shape that is close to perfect circle following the inner circumferential surface of the bearing housing. Thereby, due to the section near the planar portion making strong contact with the rotating shaft, a force that constricts the rotating shaft (local preload) is produced, leading to an increase in the starting torque, and the heat generation during operation of the rotating shaft 1 becoming higher than the setting.

In order to reduce this force that constricts the rotating shaft (local preload), methods are conceivable to eliminate the mountain of the bump foil (back foil) that supports both end regions of the top foil. However, when the mountain of the bump foil is eliminated, since the support rigidity of the rotating shaft at the sections where the mountain was eliminated falls drastically, the restraint is not effective when the rotating shaft tries to move toward that section due to an impact load or the like, and so there is an increase in the possibility of a rotating portion such as an impeller that is provided on the rotating shaft making contact with the static portion (housing portion).

Also, a method is also conceivable to reduce the bump foil of the aforementioned section by only one mountain so as to not excessively lower the support rigidity of the rotation shaft at that section. However, since the reduction amount is on the order of several tens of micrometers, its manufacture is extremely difficult.

BRIEF SUMMARY OF THE INVENTION

The present invention was achieved in view of the above circumstances, and has as its first object to provide a radial foil bearing that sufficiently minimizes the strain that occurs in the top foil, and is capable of attaining as-designed good performance with regard to the load capability and the dynamic characteristics (rigidity and attenuation) of the bearing, and moreover keeps down processing costs. Also, it has as its second object to provide a radial foil bearing that prevents the occurrence of a force that constricts the rotating shaft (local preload).

The radial foil bearing of the present invention is a radial foil bearing that, by being fitted on a rotating shaft, supports the rotating shaft, being provided with a cylindrical top foil that is arranged facing the rotating shaft; a back foil that is arranged on the outer side of the top foil in the radial direction; and a cylindrical bearing housing that houses the top foil and the back foil in the state of being inserted therein, characterized by a through-slot that is continuous from one end to the other end along the axial direction being formed in the inner circumferential surface of the bearing housing; a fixing tool that forms a plurality of engagement slots by dividing the through-slot in the lengthwise direction being fitted in the through-slot; a regulating portion that regulates the movement of the fixing tool in the lengthwise direction of the through-slot being provided in the through-slot and the fixing tool; the top foil being formed by a metal foil that is rectangular and has a first uneven portion consisting of a convex portion and a concave portion on one side, and has a second uneven portion that forms a concave portion at a position corresponding to the convex portion of the first uneven portion and forms a convex portion at at least a portion of the position corresponding to the concave portion of the first uneven portion on the other side that is opposite the one side being wound into a cylindrical shape so that the first uneven portion and the second uneven portion overlap, and each convex portion in the first uneven portion and the second uneven portion passes through each respectively corresponding concave portion in the first uneven portion and the second uneven portion to be drawn out to the bearing housing side; and the convex portions that have been drawn out to the bearing housing side engaging with the respectively corresponding engagement slots.

In this radial foil bearing, since the metal foil that has the first uneven portion and the second uneven portion is wound in a cylindrical shape so that the first uneven portion and the second uneven portion overlap, and the convex portion of each uneven portion is drawn out to the bearing housing side, and these drawn-out convex portions are made to be engaged with the engagement slots formed by the fixing tool in the through-slot of the inner circumferential surface of the bearing housing, it is possible to house and fix the top foil in the bearing housing without performing spot welding or bending on the top foil, and without producing a strong reaction force from both end portions toward the center. Accordingly, it is possible to prevent the occurrence of strain in the top foil, and to sufficiently reduce the strain of the top foil.

Also, since the through-slot is formed continuously from one end to the other end along the axial direction of the bearing housing, it is possible to easily form the through-slot by for example wire cut discharge machining.

Also, when a shift in the axial direction occurs between the top foil and the bearing housing, due to the convex portions that are engaged with the engagement slots, which are formed by the through-slot being divided in the lengthwise direction, being regulated by the end portions of the engagement slots so that the movement is stopped, further shifting is prevented. Moreover, since a regulating portion that regulates movement of the fixing tool in the lengthwise direction of the through-slot is provided in the through-slot and the fixing tool, it is possible to also stop movement of the fixing tool. Accordingly, it is possible to reliably prevent the top foil from dropping out from the bearing housing.

Also, in the radial foil bearing, locking concave portions that lock the distal end portions of the convex portions are preferably formed along the lengthwise direction of the through-slot.

If done in this way, by causing the convex portions of the top foil to be locked in the locking concave portions, it is possible to easily perform positioning and locking of the convex portions, and moreover it is possible to improve the assembly reproducibility of the top foil.

Also, in the radial foil bearing, the regulating portion is preferably constituted by a locking groove that is formed in the thickness direction of the bearing housing at both side surfaces of the bearing housing to be in communication with both end portions of the through-slot, and a bend piece that is respectively formed at both end portions of the fixing tool to be locked in the locking groove.

If done in this way, it is possible to reliably regulate movement of the fixing tool with respect to the through-slot in the lengthwise direction thereof, and thereby the top foil is reliably prevented from dropping out from the bearing housing. Also, it is possible to easily perform the machining of the locking groove by for example wire cut discharge machining.

Also, in the radial foil bearing, at the one side and the other side of the top foil, a thin-walled portion that is thin compared to the central portion therebetween is preferably formed.

If done in this way, both end portions of the top foil readily undergo elastic deformation, and the occurrence of a force that constricts the rotating shaft at both end portions (local preload) is inhibited.

Also, in the radial foil bearing, the outer circumferential surface of the thin-walled portion is preferably formed in recessed state from the outer circumferential surface of the central portion.

If done in this way, a gap is formed between the thin-walled portion and the back foil that supports the outer circumferential surface side of the thin-walled portion, and accordingly the occurrence of a force that constricts the rotating shaft at the thin-walled portion (local preload) is reliably prevented.

According to the radial foil bearing of the present invention, since the occurrence of strain in the top foil is prevented, and the strain of the top foil is sufficiently reduced, with regard to the load capability and the dynamic characteristic (rigidity and attenuation) of the bearing, it is possible to obtain as-designed good performance.

Also, forming the through-slot continuously from one end to the other end of the bearing housing simplifies formation of the through-slot, and simply fitting the fixing tool in the through-slot enables formation of a plurality of engagement slots. Therefore, by simplifying the machining of the through-slot and the engagement slots, it is possible to sufficiently keep down the machining costs.

DETAILED DESCRIPTION OF EMBODIMENTS

Hereinbelow, the radial foil bearing of the present invention shall be described in detail while referring to the drawings. Note that in the drawings given below, the scale of each member is suitably altered in order to make each member a recognizable size.

Figure 1:
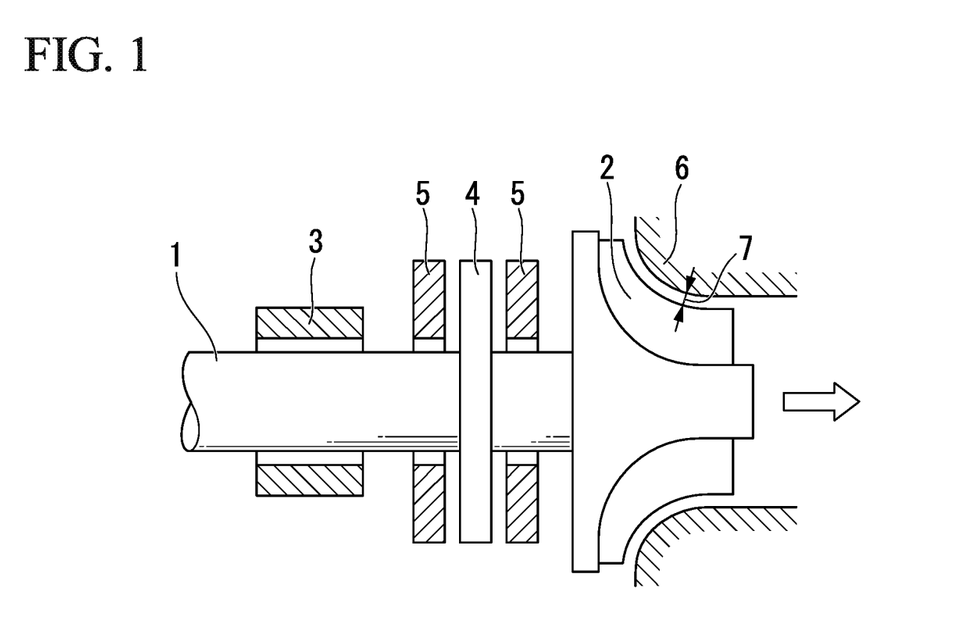
FIG. 1 is a schematic drawing that shows an example of a turbomachine in which the radial foil bearing according to the present invention is applied.

FIG. 1 is a side view that shows an example of a turbomachine in which the radial foil bearing according to the present invention is applied. In FIG. 1, 1 denotes a rotating shaft, 2 denotes an impeller that is provided at the distal end portion of the rotating shaft, and 3 denotes a radial foil bearing according to the present invention. Note that FIG. 1 only shows one radial foil bearing for abbreviation, but normally two radial foil bearings are provided in the shaft direction of the rotating shaft 1, whereby the support structure of the rotating shaft 1 is constituted. Accordingly, in the present embodiment, two radial foil bearings 3 shall be assumed to be provided.

A thrust collar 4 is fixed to the side of the rotating shaft 1 at which the impeller 2 is formed. On both sides of this thrust collar 4, a thrust bearing 5 is arranged on each side in a manner facing the thrust collar 4.

Also, the impeller 2 is arranged within a housing 6 that serves as the static side, and has a tip clearance 7 with the housing 6.

Also, the radial foil bearing 3 is fitted on the rotating shaft 1 more toward the middle side of the rotating shaft 1 than the thrust collar 4.

Figure 2A:
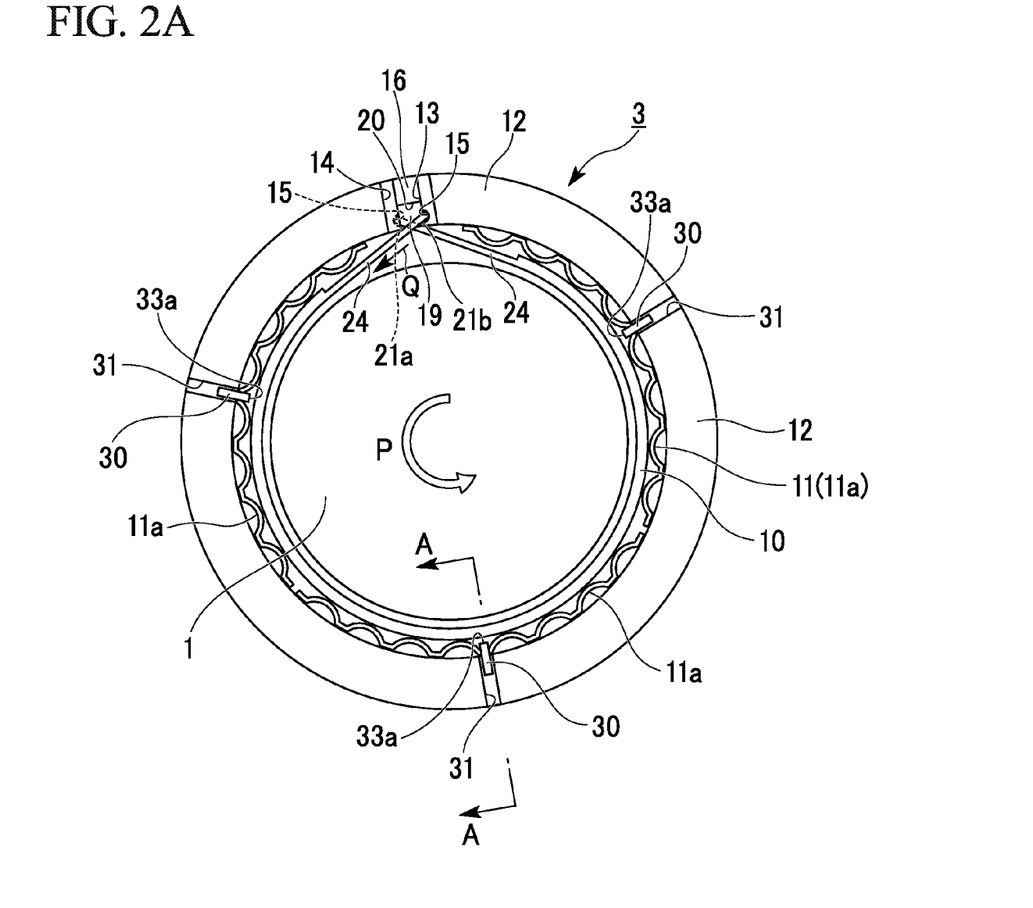
FIG. 2A is a side view of the outline constitution of the first embodiment of the radial foil bearing according to the present invention.
Figure 2B:
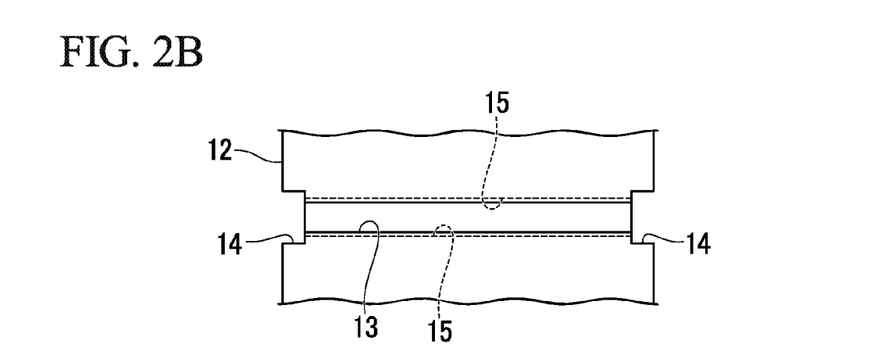
FIG. 2B is a drawing that shows main portions of the inner circumferential surface of the bearing housing, in the outline constitution of the first embodiment of the radial foil bearing according to the present invention.

FIG. 2A and FIG. 2B are drawings that show the first embodiment of the radial foil bearing that is applied to a turbomachine with the aforementioned constitution. As shown in FIG. 2A, the radial foil bearing 3 of this first embodiment has a cylindrical shape that is fitted on the rotating shaft 1 to support the rotating shaft 1, and is provided with a cylindrical top foil 10 that is arranged facing the rotating shaft 1, a back foil 11 that is arranged on the radial-direction outer side of the top foil 10, and a bearing housing 12 that is arranged on the radial-direction outer side of the back foil 11.

The bearing housing 12 is a cylindrical shaped component made of metal that constitutes the outermost portion of the radial foil bearing 3, and houses in its interior the back foil 11 and the top foil 10. A through-slot 13 along the axial direction of the bearing housing 12 is formed on the inner circumferential surface of the bearing housing 12. That is to say, the through-slot 13 is formed in the inner circumferential surface of the bearing housing 12 along the entire length continuously from one end to the other end of the bearing housing 12 in the axial direction, as shown in FIG. 2B that shows the main portions of the inner circumferential surface of the bearing housing 12. The through-slot 13 is formed with a length of around 35 mm which is the same as the length of the bearing housing 12, an opening width of around 0.4 mm to 0.6 mm, and a depth of around 1.5 mm to 2.5 mm.

Figure 3A:
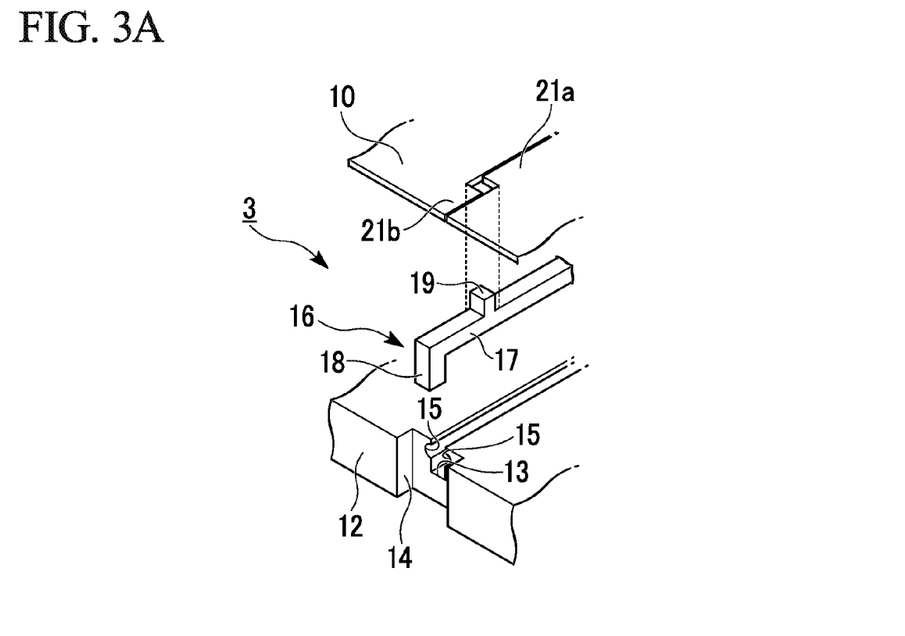
FIG. 3A is a main portion exploded perspective view of the radial foil bearing shown in FIG. 2A.

Also, at both end portions of the through-slot 13, a locking groove 14 is formed in communication with the through-slot 13. As shown in FIG. 3A, which is a main portion exploded perspective view of the radial foil bearing 3, the locking groove 14 is formed by both side surfaces of the bearing housing 12 being cut out, and so is formed continuously from the outer circumferential edge to the inner circumferential edge along the thickness direction of the bearing housing 12. Note that in the present embodiment, the width of the locking groove 14 is formed sufficiently wide compared to the width of the through-slot 13, to allow the locking groove 14 to reliably communicate with the through-slot 13.

Also, a locking concave portion 15 is formed in both inner side surfaces of the through-slot 13. This locking concave portion 15 has a groove shape that is formed along the entire length along the length direction of the through-slot 13, and in the present embodiment, is formed in a cross-sectional U shape (semicircular arc shape) with a maximum depth of 0.2 to 0.3 mm. Also, these locking concave portions 15 are formed for example at a depth position of within 1 mm from the inner circumferential surface of the bearing housing 12, at the opening side of the through-slot 13. Thereby, the locking concave portions 15 are capable of locking the distal end portions of the convex portions of the top foil 10 described below.

Here, wire cut discharge machining is favorably used to form the through-slot 13 and the locking concave portion 15. That is to say, when forming grooves that continue from one end to the other end in the axial direction of the bearing housing 12 in the manner of the through-slot 13 and the groove-shaped locking concave portions 15, it is possible to easily and accurately for each groove by causing a wire to move so as to trace the contour of the cross-sectional shape by wire cut discharge machining. In the present embodiment in particular, since it is possible to easily form the through-slot 13 and the locking concave portions 15 on both side surfaces thereof by a series of workings, by adopting wire cut discharge machining in this manner, it is possible to keep the processing cost of the through-slot 13 and the locking concave portions 15 sufficiently low.

Also, since the locking groove 14 also forms a groove that is continuous from the outer surface side to the inner surface side of the bearing housing 12, it is possible to keep its processing cost sufficiently low by adopting wire cut discharge machining. However, since machining accuracy is not particularly required for the locking groove 14, it is possible to adopt cutting by an end mill or the like.

A fixing tool 16 is fitted and locked in this kind of through-slot 13 and the locking groove 14. The fixing tool 16, as shown in FIG. 3A, FIG. 3B, and FIG. 3C, has a bar-shaped (square pole-shaped) base portion 17 that is fitted and housed in the through-slot 13, a pair of bend pieces 18 and 18 that are formed at both end portions of the base portion 17 and that lock into the locking grooves 14 and 14, and two partition pieces 19 that are formed in the center portion of the base portion 17 to project to the side opposite the bend pieces 18.

The base portion 17 is formed with a height of around 0.5 to 1.5 mm, and the upper surface thereof (the surface on the side of the partition pieces 19), is formed so as to sink about 1 mm below the opening of the through-slot 13. The bend piece 18 is formed to a length that is approximately equal to the distance between the bottom surface of the through-slot 13 and the outer circumferential surface of the bearing housing 12, and thereby abuts the locking groove 14 with sufficient surface area, and also does not project out from the outer circumferential surface of the bearing housing 12.

Here, a regulating portion according to the present invention is formed by the bend pieces 18 and the locking grooves 14 that are provided continuously in the through-slot 13. That is to say, the pair of bend pieces 18 and 18 respectively lock into the locking grooves 14 and 14 provided at both end portions of the through-slot 13, and accordingly by sandwiching the bearing housing 12 with the pair of bend pieces 18 and 18, movement of the fixing tool 16 is regulated in the lengthwise direction of the through-slot 13 (the axial direction of the bearing housing 12), and it essentially is made not to move except for the clearance.

Figure 3B:
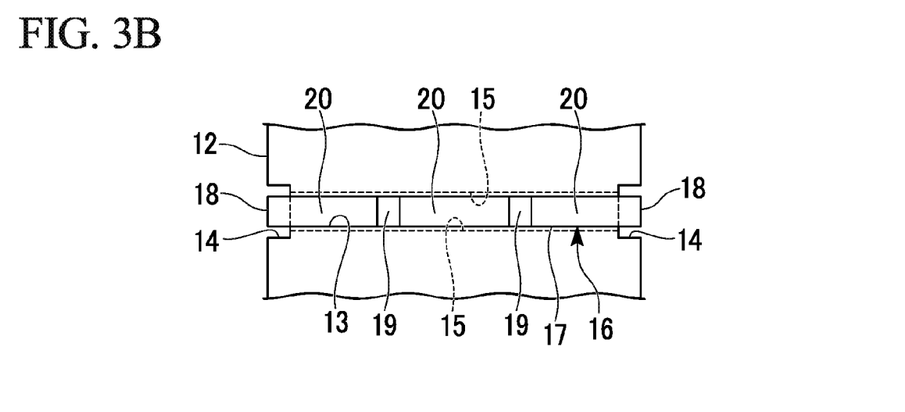
FIG. 3B is a plan view that shows the state of the fixing tool being fitted in the through-slot.
Figure 3C:
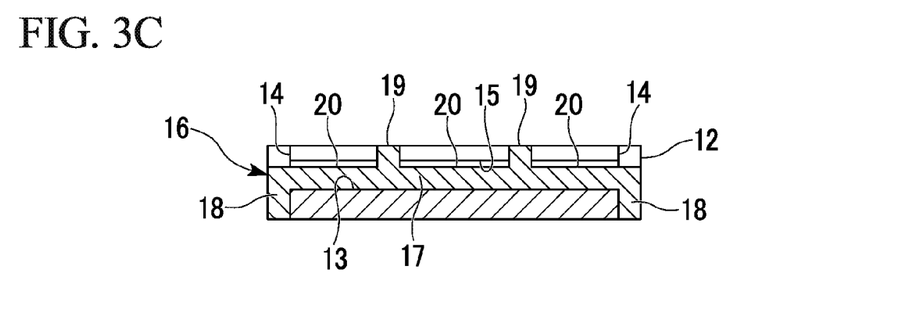
FIG. 3C is a side cross-sectional view that shows the state of the fixing tool fitted in the through-slot.

The partition pieces 19 divide the base portion 17 into three equal portions as shown in FIG. 3B and FIG. 3C, and accordingly are formed at two portions that divide the through-slot 13 into three equal portions. The partition piece 19 is formed so that its height is at the same level as the opening position of the through-slot 13, or so as to project out a little from the through-slot 13. For example, it may be made to project out around half the height of the back foil 11. Due to the through-slot 13 being divided into three equal portions in the lengthwise direction thereof by the partition pieces 19, three engagement slots 20 are formed by the fixing tool 16 in the through-slot 13.

That is to say, by fitting and locking the fixing tool 16 into the locking grooves 14 and the through-slot 13 from the inner circumferential surface side of the bearing housing 12, it is possible to easily form the three engagement slots 20. These engagement slots 20 have a depth of around 1 mm. Also, the locking concave portion 15 opens to both inner side surfaces thereof.

Note that the fixing tool 16 can be formed by performing wire cut discharge machining on a metal plate consisting of stainless steel or the like having a thickness of 3 to 4 mm.

Figure 4A:
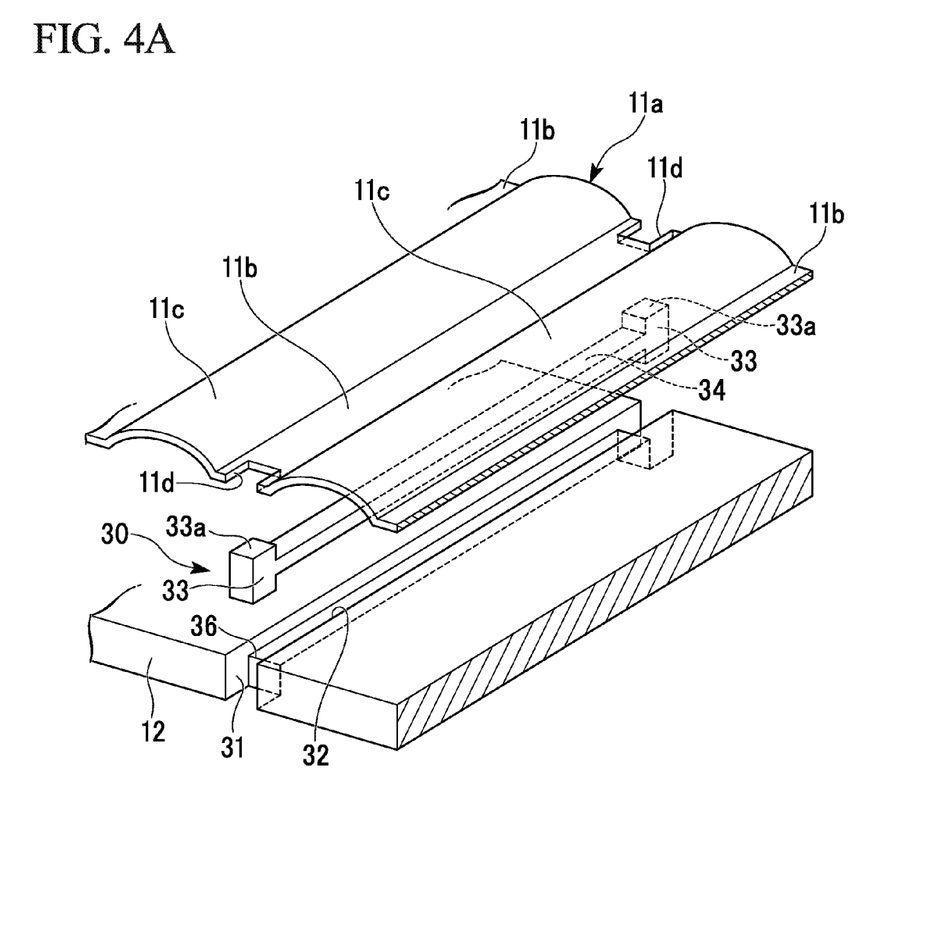
FIG. 4A is a main portion exploded perspective view of the radial foil bearing.

Also, an engagement convex portion 33a for locking a back foil 11 described below is formed by a locking member 30 in the bearing housing 12 as shown in FIG. 2A. That is to say, as shown in FIG. 4A that is a main portion exploded perspective view of the radial foil bearing 3, an engagement concave portion 31 with a slot shape that extends from the outer circumferential edge to the inner circumferential edge of the bearing housing 12 are formed mutually opposed at both side surfaces of the bearing housing 12. In the present embodiment as shown in FIG. 2A, the engagement concave portion 31 is formed at positions that divide the side surface of the bearing housing 12 into three equal portions in the circumferential direction. The locking member 30 is locked to these engagement concave portions 31. Note that in the present embodiment, viewed from one side surface of the bearing housing 12, the through-slot 13 is arranged between two of the engagement concave portions 31 and 31 among the three engagement concave portions 31.

Also, in the inner circumferential surface of the bearing housing 12, a slot 32 that communicates with the engagement concave portion 31 and 31 is formed between the opposing engagement concave portion 31 and 31 as shown in FIG. 4A. The depth of the slot 32 is shallower than the depth of the engagement concave portion 31, that is, the depth heading to the outer surface side of the bearing housing 12 (which in the present embodiment is equal to the thickness of the bearing housing 12). Thereby, in the present embodiment, a step portion 36 is formed between the engagement concave portion 31 and the slot 32.

Figure 4B:
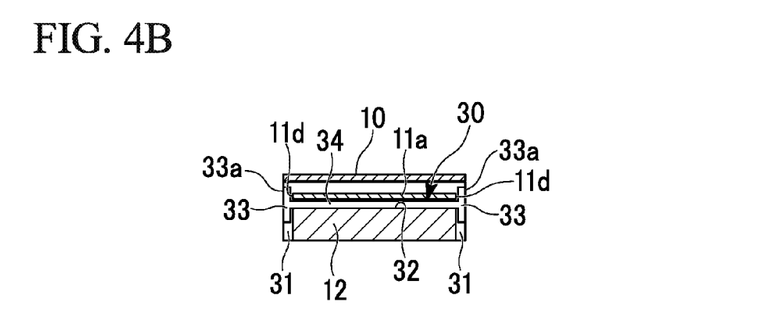
FIG. 4B is a cross-sectional view taken along the A-A arrows of FIG. 2A.

The locking member 30 is locked into these engagement concave portion 31 and 31 and the slot 32. The locking member 30 is formed in an H shape that has a pair of engagement arms 33 that engage with the engagement concave portion 31 and 31, and a connecting portion 34 that connects these engagement arms 33 and 33. As shown in FIG. 4B, which is an arrow cross-sectional view along line A-A of FIG. 2A, the connecting portion 34 engages with the slot 32 and is housed in the slot 32, and is formed so as to not project to the outer side of the slot 32. Specifically, the depth of the slot 32 is around 1 mm to 2 mm. Accordingly, the height of the connecting portion 34 is around 1 mm to 2 mm.

The pair of engagement arms 33 are formed to extend in the vertical direction with respect to the connecting portion 34, and thereby form the locking member 30 in an H shape as described above. The portion of these engagement arms 33 that extends to the upper side, that is to say, the side opposite the side of engagement with the engagement concave portion 31, is an engagement convex portion 33a that engages with an engagement notch 11d of a back foil piece 11a described below, by projecting beyond the inner circumferential surface of the bearing housing 12.

Also, the portion of the engagement arm 33 that extends to the lower side is locked to the step portion 36 between the engagement concave portion 31 and the slot 32 described above. Thereby, movement of the locking member 30 with respect to the bearing housing 12 is regulated in the axial direction thereof.

Note that the engagement arm 33 and the connecting portion 34 of the locking member 30 may be in the shape of a square pole as shown in FIG. 4A, or in the shape of a circular column (round bar), with the thickness thereof being around 0.3 to 0.5 mm. It is possible to form this kind of locking member 30 by for example etching or wire cut discharge machining a metal foil consisting of stainless steel or the like with a thickness of less than 0.5 mm into an H shape.

Also, the slot 32 can be formed by wire cut discharge machining similarly to the through-slot 13. Moreover, it is possible to machine the engagement concave portion 31 by wire cut discharge machining or cutting by an end mill or the like, similarly to the locking groove 14. That is to say, it is possible to continuously machine the through-slot 13 and the slot 32 by wire cut discharge machining. Similarly, it is possible to continuously machine the locking groove 14 and the engagement concave portion 31 by wire cut discharge machining. Accordingly, it is possible to achieve a reduction in the machining cost of the bearing housing 12.

After having formed the slot 32 and the engagement concave portion 31 in this way, by fitting and locking the locking member 30 in the engagement concave portion 31 and the slot 32 from the inner circumferential surface side of the bearing housing 12, it is possible to easily form the engagement convex portion 33a.

The back foil 11 as shown in FIG. 2A resiliently supports the top foil 10 by being formed with a foil (thin plate). As this kind of back foil 11, for example a bump foil, a spring foil as disclosed in Patent Document 2 or Patent Document 3 and the like, or a back foil as disclosed in Patent Document 4 is used. In the present embodiment, a bump foil is used as the back foil 11. However, the aforementioned spring foil or back foil may also be used as the back foil of the present invention.

In the present embodiment, the back foil (bump foil) 11 is constituted by three (a plurality) of back foil pieces (bump foil pieces) 11a that are arranged along the circumferential direction of the top foil 10. In each back foil piece 11a, the foil (thin plate) thereof is molded in a corrugated shape, and the side surface is molded so as to assume an approximate circular arc overall. The three back foil pieces 11a are all formed with the same shape and dimensions. Accordingly, these back foil pieces 11a are arranged dividing the inner circumferential surface of the bearing housing 12 into approximately three portions.

Also, although these back foil pieces 11a are arranged with a gap of a certain amount opened at the position where they sandwich the through-slot 13, at positions other than that, they are arranged with their mutual end portions being contiguous. With this kind of constitution, the three back foil pieces 11a are formed in an approximate cylindrical shape as a whole, and are arranged along the inner circumferential surface of the bearing housing 12.

Figure 5A:
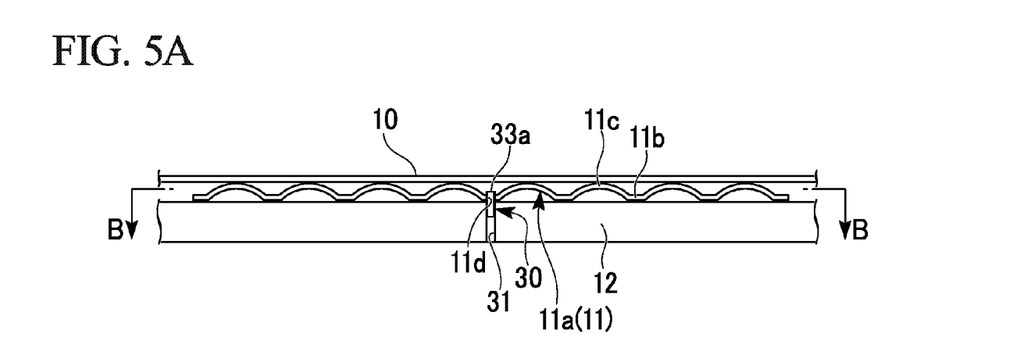
FIG. 5A is a side view that schematically shows the main portions of FIG. 2A flattened.

Also, in the back foil piece 11a that is molded in a corrugated shape in this manner, as shown in FIG. 5A that schematically shows the essential portions of FIG. 2A flattened out, a flat valley portion 11b that makes contact with the bearing housing 12, and a curved mountain portion 11c that makes contact with the top foil 10 are alternately formed along the circumferential direction of the bearing housing 12. Thereby, the back foil pieces 11a resiliently support the top foil 10 particularly by the mountain portions 11c that make contact with the top foil 10. Also, a fluid passage is formed by the mountain portion 11c and the valley portion 11b in the axial direction of the radial foil bearing 3.

Figure 5B:
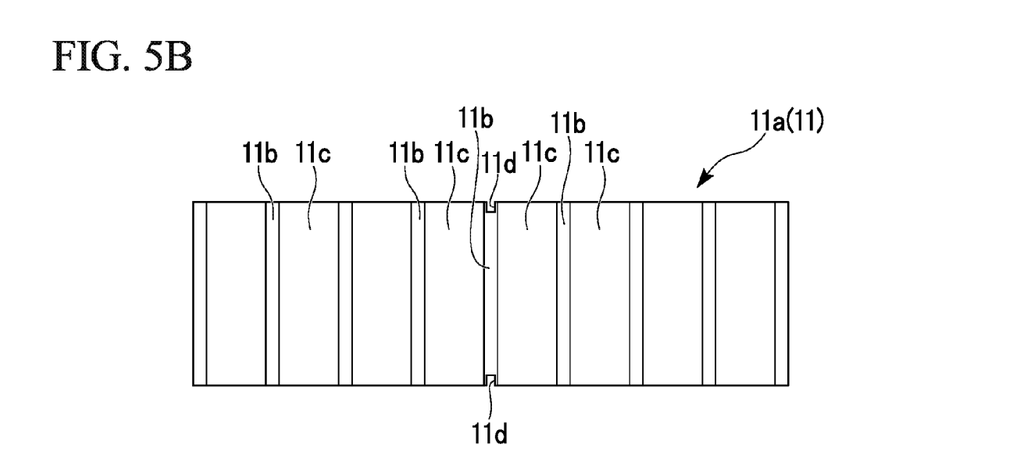
FIG. 5B is a view taken along the B-B arrows of FIG. 5A.

As shown in FIG. 5B that is an arrow view along line B-B of FIG. 5A, in each back foil piece 11a an engagement notch 11d is formed in the circumferential edge portion of both sides at the center portion in the circumferential direction (the center portion in the direction along the circumferential direction of the bearing housing 12). The engagement notch 11d is formed at the valley portion 11b of the back foil piece 11a as shown in FIG. 5A. Moreover, the engagement notch 11d is formed by the valley portion 11b, which consists of the flat portion formed between mountain portions 11c and 11c, being cut away in a rectangular shape from the side circumferential edge thereof toward the inside.

The engagement notch 11d is formed at a position that overlaps with the position corresponding to the engagement convex portion 33a of the locking member 30 provided in the bearing housing 12, that is to say, the engagement convex portion 33a. The horizontal and vertical widths of the engagement notch 11d are formed to be nearly the same as the horizontal and vertical widths of the engagement convex portion 33a so as to engage with the engagement convex portion 33a. Specifically, the horizontal width of the bearing housing 12 along the circumferential direction is around 0.2 mm to 0.4 mm, while the vertical width along the axial direction is around 1 mm to 2 mm.

Note that it is preferred to form the engagement notch 11d using etching or wire cut discharge machining of a foil so that burrs do not occur and so as to not generate strain from the machining. That is to say, it is preferred to form the back foil piece 11a by performing press molding for forming the mountain portions 11c and the valley portions 11b after forming the engagement notches 11d in the foil by etching or wire cut discharge machining.

Based on this kind of constitution, the engagement notch 11d of the back foil piece 11a as shown in FIG. 4A and FIG. 5A engages with the engagement convex portion 33a of the bearing housing 12.

In this way, the engagement notch 11d of the back foil piece 11a engages with the engagement convex portion 33a that extends to the upper side of the engagement arm 33, and in that state the three back foil pieces 11a are arranged on the inner circumferential surface of the bearing housing 12. Accordingly, the locking member 30 is prevented from dropping out from the bearing housing 12 particularly by the connecting portion 34 thereof being pressed by the back foil piece 11a.

As shown in FIG. 2A, the top foil 10 is wound in a cylindrical shape along the inner surface of the back foil 11 that consists of the three back foil pieces 11a. A convex portion 21a that is formed at one end portion side of the top foil 10 and the convex portions 21b that are formed at the other end portion side are disposed so as to respectively engage with the engagement slots 20 in the through-slot 13 that is formed in the bearing housing 12. This top foil 10 is formed by a rectangular metallic foil, of which the bearing circumferential direction is the long side and the bearing length direction is the short side, that is wound in a cylindrical shape in the arrow direction in FIG. 6B, which is a side surface view (lengthwise direction of the long side: bearing circumferential direction).

Figure 6A:
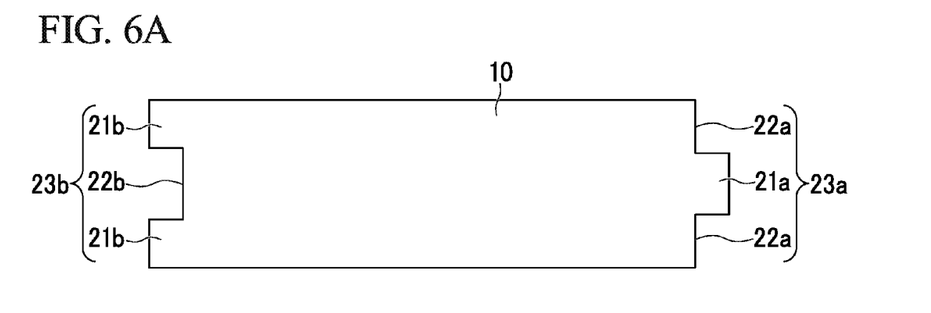
FIG. 6A is an opened-up view of the top foil.

In this top foil 10, as shown in FIG. 6A a first uneven portion 23a consisting of one convex portion 21a and two concave portions 22a is formed on one side (short side). Also, a second uneven portion 23b consisting of two convex portions 21b and one concave portion 22b is formed on the other side (short side) opposite the one side (short side). The concave portion 22b of the second uneven portion 23b is formed corresponding to the convex portion 21a of the first uneven portion 23a, and the concave portions 22a of the first uneven portion 23a are formed corresponding to the convex portions 21b of the second uneven portion 23b.

That is to say, the concave portion 22b of the second uneven portion 23b is formed so that the convex portion 21a passes through the concave portion 22b when the top foil 10 is wound in a cylindrical shape so that the first uneven portion 23a and the second uneven portion 23b overlap. Similarly, the concave portions 22a of the first uneven portion 23a are formed so that when the top foil 10 is wound in a cylindrical shape the convex portions 21b respectively pass through the concave portions 22a. Note that the widths of the convex portions 21a and 21b are formed corresponding to the lengths of the engagement slots 20 formed by the through-slot 13 and the fixing tool 16 to substantially agree therewith.

Figure 7:
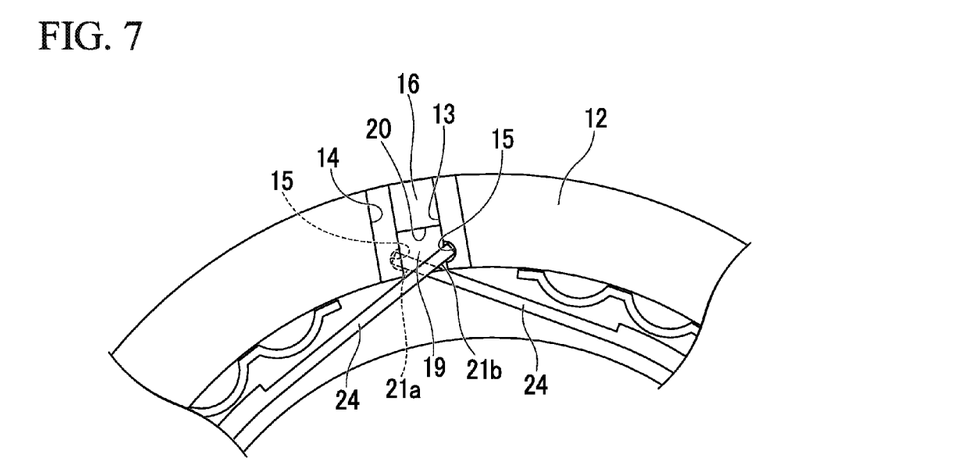
FIG. 7 is an enlargement of the main portions of FIG. 2A.

The convex portions 21a and 21b that have passed through the concave portions 22b and 22a are respectively drawn out to the bearing housing 12 side as shown in FIG. 2A, and the distal end portions thereof are made to be engaged with the engagement slots 20 of the bearing housing 12. In the present embodiment, as shown in FIG. 7 that is a main portion enlarged view of FIG. 2A, the distal end portions of the convex portions 21a and 21b are respectively inserted in the engagement slots 20 in the through-slot 13, engaged, and moreover inserted in the locking concave portions 15 and locked. Thereby, the top foil 10 is arranged so that its movement in the circumferential direction thereof is regulated, and the amount of movement becomes very small.

That is to say, the distal end portions of the convex portions 21a and 21b are not strongly abutted against the inner surface of the locking concave portions 15, but rather the distal end portion side surface is arranged to an extent of making contact with the inner surface of the locking concave portion 15. Accordingly, during ordinary operation of the rotating shaft 1, since the convex portions 21a and 21b do not receive a large reaction force from the locking concave portions 15 or engagement slots 20, strain is not caused in the top foil 10. Also, even when an unforeseen external force is applied to the radial foil bearing 3 due to axial deflection of the rotating shaft 1 or the like, the top foil 10 does not rotate within the bearing housing 12, and moreover it does not drop out from between the bearing housing 12 and the rotating shaft 1.

In other words, when an unforeseen external force is added, due to the convex portions 21a and 21b being firmly locked with the locking concave portions 15, these convex portions 21a and 21b do not detach from the locking concave portions 15, and moreover do not detach from the engagement slots 20 either. Accordingly, falling out of the top foil 10 from the bearing housing 12 due to rotation of the top foil 10 and its excessive deformation leading to the convex portions 21a and 21b slipping out from the concave portions 22b and 22a is prevented.

Also, due to the partition pieces 19 of the fixing tool 16 that partition the engagement slots 20, movement of the convex portions 21a and 21b in the axial direction is regulated. That is to say, due to the convex portion 21a being regulated on both sides by the partition pieces 19, movement in the axial direction of the first uneven portion 23a side that forms the convex portion 21a is regulated. Also, due to the two convex portions 21b being regulated at each respective one side by the partition pieces 19, and being regulated in mutually opposite directions, movement in the axial direction of the second uneven portion 23b side that forms these two convex portions 21b is also regulated. In this way, since movement of the top foil 10 in the axial direction of the bearing housing 12 is regulated, it is prevented from jumping out from the bearing housing 12 to the outside.

Figure 6B:
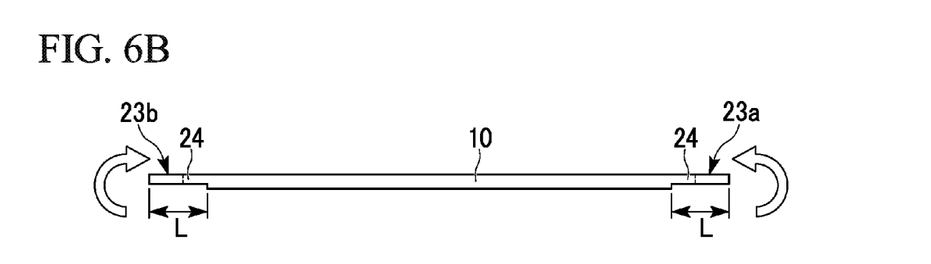
FIG. 6B is an opened-up side view of the top foil

Also, as shown in FIG. 6B, at the side that forms the first uneven portion 23a (one side) and the side that forms the second uneven portion 23b (other side) of the top foil 10, a thin-walled portion 24 that is thin compared to the central portion therebetween is formed. As shown in FIG. 2A, these thin-walled portions 24 are formed by the outer circumferential surface thereof (the surface on the side of the back foil 11) being reduced in thickness so as to assume a recessed state of being recessed from the outer circumferential surface of the middle portion.

The thin-walled portions 24 are formed to a desired thickness (thinness) by controlling in units of tens of micrometers both end portions of the top foil 10 by, for example, etching. Specifically, in the case of the bearing diameter being ϕ35 mm, assuming the thickness of the top foil 10 is 100 micrometers, the thickness of the thin-walled portions 24 is formed to be around 80 micrometers. Note that due to the aforementioned etching, the stress that is produced in the top foil 10 is extremely small compared to bending and the like. Accordingly, there is hardly any strain produced in the top foil 10.

Also, the length L in the circumferential direction of the thin-walled portion 24 shown in FIG. 6B is made to be a length corresponding to up to one mountain portion at the end portion of the bump foil 11 from the through-slot 13 as shown in FIG. 2A.

By forming the thin-walled portion 24 at both end portions of the top foil 10 in this manner, these both end portions (thin-walled portions 24) readily undergo elastic deformation. Accordingly, both these end portions become curved surfaces following the curved surface that constitutes the inner circumferential surface of the bearing housing 12. Thereby, at both end portions of the top foil 10, hardly any force that constricts the rotating shaft 1 (local preload) is produced.

Also, since the thin-walled portions 24 are formed by reducing the thickness of the outer circumferential surface of the top foil 10 at both end portions so as to assume a recessed state from the outer circumferential surface of the central portion, a gap of over one mountain portion at the end portion of the back foil 11 is formed between the thin-walled portion 24 and the back foil 11 that supports the outer circumferential surface side thereof. Thereby, the occurrence of a force that constricts the rotating shaft 1 (local preload) is reliably prevented at the thin-walled portions 24. Note that the length L in the circumferential direction of the thin-walled portion 24 may also be made a length corresponding to up to around three mountain portions at the end portion of the bump foil 11 from the through-slot 13, as a substitute for the example shown in FIG. 2A.

Next, the action of the radial foil bearing 3 that consists of the aforementioned constitution shall be described.

In the state of the rotating shaft 1 being stopped, the top foil 10 is in close contact with the rotating shaft 1 by being biased to the side of the rotating shaft 1 by the back foil 11 (the three back foil pieces 11a). Note that in the present embodiment, since both ends portions of the top foil 10 are the thin-walled portions 24, a force that constricts the rotating shaft 1 (local preload) is hardly produced at these thin-walled portions 24.

When the rotating shaft 1 is started to rotate in the direction of the arrow P in FIG. 2A, rotation begins initially at a low speed, and it accelerates gradually thereafter to rotate at a high speed. Then, as shown by the arrow Q in FIG. 2A, a perimeter fluid is drawn in from the space between one side of the top foil 10 and one end of the bump foil piece 11a, and flows into the space between the top foil 10 and the rotating shaft 1. Thereby, a fluid lubrication film is formed between the top foil 10 and the rotating shaft 1.

The film pressure of this fluid lubrication film acts on the top foil 10, and presses each of the mountain portions 11c of the back foil pieces 11a which are in contact with the top foil 10. As a result, due to the back foil pieces 11a being pressed by the top foil 10, the mountain portions 11c are pushed and widened. Thereby, the back foil pieces 11a attempt to move in the circumferential direction above the bearing housing 12.

That is to say, since the back foil pieces 11a (back foil 11) resiliently support the top foil 10, upon receiving a load from the top foil 10, they deform in the circumferential direction, and thereby permit flexure of the top foil 10 and support it.

However, as shown in FIG. 4A and FIG. 4B, the engagement convex portions 33a of the locking member 30 are engaged in the engagement notches 11d that are provided the circumferential edge portions. Thereby, the back foil pieces 11a are prevented from rotating in the circumferential direction on the inner circumferential surface of the bearing housing 12. Accordingly, although each mountain portion 11c of the back foil piece 11a deforms (moves) in the circumferential direction with the engagement notches 11d in which the engagement convex portions 33a are engaged serving as fixed points (fixed ends), there is no shifting of the center of each back foil piece 11a itself from the fixed position.

Also, when the back foil pieces 11a deform (move) in the circumferential direction, they are affected by friction with the bearing housing 12 and the top foil 10. For this reason, although they easily deform (easily move) at both end portions, that is to say, the free end sides, they are hindered from deforming at the fixed point (fixed end) side.

For that reason, a difference in support rigidity by the back foil pieces 11a arises between the free end side and the fixed end side.

However, in the present embodiment, the engagement notch 11d is formed in the center portion of the back foil piece 11a in the circumferential direction, and accordingly the fixed point by the engagement convex portions 33a is at the center portion of the back foil piece 11a in the circumferential direction. For that reason, due to the distance between the fixed end and the free end being short, the difference in the support rigidity becomes small. Moreover, the back foil 11 is divided into the three back foil pieces 11a. For that reason, compared to the case of forming the back foil 11 with a single foil, the distance between the fixed end and the free end is short, and so the difference in support rigidity between the free end side and the fixed end side becomes smaller.

Also, when the rotating shaft 1 is rotating at a high speed, since the engagement convex portions 33a restrict movement of the back foil pieces 11a in the axial direction, even in the case of an unforeseen impact being applied, the back foil pieces 11a do not drop out from the bearing housing 12.

Also, in the transient state until the fluid lubricating film is formed, solid friction is produced between the rotating shaft 1 and the top foil 10, and this serves as resistance during starting. However, preload is not produced at both end portions of the top foil 10 as described above, and the top foil 10 at the side at which the ambient fluid flows in becomes the thin-walled portion 24 and so is flexible. For this reason, a space between the top foil 10 and the rotating shaft 1 easily opens, and so when the rotating shaft 1 starts to rotate, the fluid lubricating film is formed quickly, so that the rotating shaft 1 rotates in a non-contact state with respect to the top foil 10.

In this kind of radial foil bearing 3, the convex portions 21a and 21b that are drawn out from the concave portions 22b and 22a of the top foil 10 are engaged in the engagement slots 20 formed by the fixing tool 16 in the through-slot 13 of the inner circumferential surface of the bearing housing 12. For that reason, it is possible to house and fix the top foil 10 in the bearing housing 12 without performing spot welding or bending on the top foil 10, and without producing a strong reaction force from both end portions toward the center. Accordingly, it is possible to prevent the occurrence of strain in the top foil 10, and so it is possible to sufficiently reduce the strain of the top foil 10. For that reason, with regard to the load capability and the dynamic characteristic (rigidity and attenuation) of the bearing, it is possible to cause it to exhibit as-designed good performance.

Also, since the through-slot 13 is formed continuously from one end to the other end along the axial direction of the bearing housing 12, it is possible to easily form the through-slot 13 by wire cut discharge machining, and it is possible to keep down the machining costs.

Also, when a shift in the axial direction occurs between the top foil 10 and the bearing housing 12, the convex portions 21a and 21b that are engaged with the engagement slots 20 formed by the through-slot 13 being divided in the lengthwise direction are regulated by the end portions of the engagement slots 20 (the partition pieces 19). For that reason, due to movement in the axial direction between the top foil 10 and the bearing housing 12 being stopped, it is possible to prevent further shifting. Moreover, since a regulating portion that regulates movement of the fixing tool 16 in the lengthwise direction of the through-slot 13 is formed by the locking groove 14 of the through-slot 13 and the bend pieces 18 of the fixing tool 16, it is possible to also stop movement of the fixing tool 16. Accordingly, it is possible to reliably prevent the top foil 10 from dropping out from the bearing housing 12.

Also, the locking concave portions 15 are formed in the inner side surfaces of the through-slot 13, and the distal end portions of the convex portions 21a and 21b of the top foil 10 are locked in the locking concave portions 15. For that reason, it is possible to easily perform positioning and locking of the convex portions 21a and 21b, and moreover it is possible to improve the assembly reproducibility of the top foil 10.

Also, regarding the top foil 10, merely by an increase in the formation of the uneven portions 23a and 23b by etching, it is possible to eliminate conventional spot welding and bending that produced strain. Accordingly, it is possible to reduce the difficulty of manufacturing the top foil 10 and reduce the manufacturing cost.

Also, since there is no welding of the top foil 10 to the bearing housing 12, there is no defective assembly or variation in assembly due to welding defects. Accordingly, the assembly reproducibility of the top foil 10 to the bearing housing 12 improves, and it has outstanding mass-productivity.

Also, in the case of a conventional type of top foil of which one end side is end stopped to the bearing housing by spot welding, with the other end side being a free end, when the rotating shaft is reverse rotated, there is a possibility of the top foil winding itself on the rotating shaft. In contrast, since the radial foil bearing 3 of the present embodiment is nearly symmetrical as shown in FIG. 2A, it functions the same during forward rotation and reverse rotation of the rotating shaft 1. Accordingly, it is possible to also apply this radial foil bearing 3 to a rotating machine in which a rotating shaft undergoes reverse rotation.

Also, since the thin-walled portion 24 is formed at both end portions of the top foil 10, there is no generation of a force that constricts the rotating shaft 1 (local preload) at both ends of the top foil 10 as described above. Accordingly, it is possible to prevent an increase in the starting torque due to the preload, and the heat generation during operation of the rotating shaft 1 becoming higher than the setting.

Also, since the thin-walled portion 24 is formed at both end portions of the top foil 10, for example a conventional heat treatment step for causing both end portions of the top foil to adapt to the inner curved surface (inner circumferential surface) of the bearing housing becomes unnecessary.

Moreover, since the thin-walled portion 24 is formed at both end portions of the top foil 10, the end portion side of the top foil 10 of the side at which the ambient fluid flows in (corresponding to the free end side of the conventional type) becomes flexible, and so as described above the ambient fluid easily flows in between the top foil 10 and the rotating shaft 1. Accordingly, a fluid lubrication film may be formed at a lower number of rotations, and so the startability of the rotating shaft 1 is improved.

Also, by causing the engagement convex portion 33a that is respectively formed at both side end portions of the inner circumferential surface of the bearing housing 12 to engage with the engagement notch 11d that is respectively formed in the circumferential edge portion of both sides of the back foil piece 11a, the back foil piece 11a is fixed to the bearing housing 12. For that reason, it is possible to house and fix the back foil piece 11a in the bearing housing 12 without performing spot welding or bending on the back foil piece 11a. Accordingly, it is possible to prevent the occurrence of strain in the top foil 10 due to the effects of spot welding of the back foil 11 (back foil pieces 11a), and the strain of the back foil 11, and so it is possible to sufficiently reduce the strain of the top foil 10. For that reason, with regard to the load capability and the dynamic characteristic (rigidity and attenuation) of the bearing, it is possible to cause it to exhibit as-designed good performance.

Next, the second embodiment of the radial foil bearing of the present invention shall be described.

The radial foil bearing of the present embodiment is also a radial foil bearing that is applied to the turbomachine shown in FIG. 1. The points of difference between the radial foil bearing of the present embodiment and the radial foil bearing 3 of the first embodiment are the shape of the top foil, and the shape of the engagement slots of the bearing housing corresponding thereto.

Figure 8A:
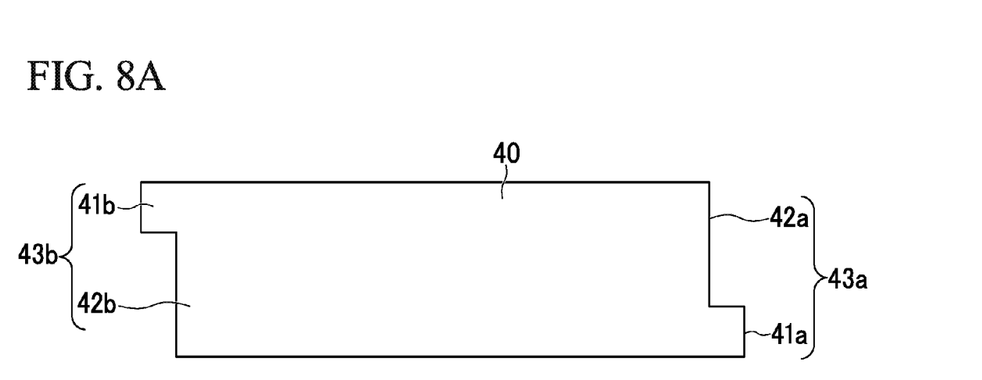
FIG. 8A is an opened-up view of the top foil of the second embodiment of the radial foil bearing according to the present invention.
Figure 8B:
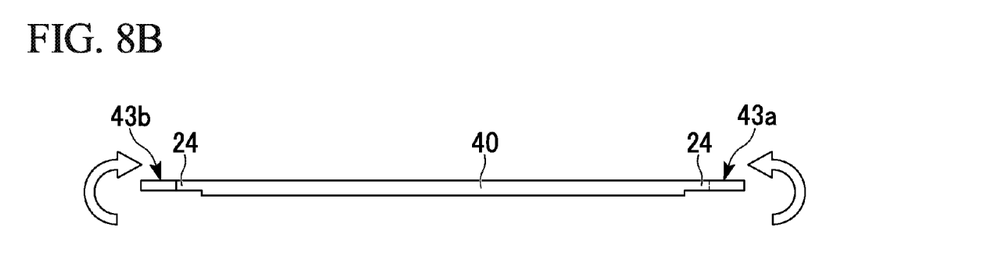
FIG. 8B is an opened-up side view of the top foil of the second embodiment of the radial foil bearing according to the present invention.

That is to say, in a top foil 40 of the radial bearing housing of the present embodiment as shown in FIG. 8A, a first uneven portion 43a having one convex portion 41a and one concave portion 42a is formed on one side (short side). Also, a second uneven portion 43b having one convex portion 41b and one concave portion 42b is formed on another side (short side) opposite the one side (short side). The concave portion 42b of the second uneven portion 43b is formed corresponding to the convex portion 41a of the first uneven portion 43a, and the concave portion 42a of the first uneven portion 43a is formed corresponding to the convex portion 41b of the second uneven portion 43b.

That is to say, the concave portion 42b of the second uneven portion 43b is formed so that the convex portion 41a passes through the concave portion 42b when the top foil 40 is wound in a cylindrical shape so that the first uneven portion 43a and the second uneven portion 43b overlap. Similarly, the concave portion 42a of the first uneven portion 43a is formed so that when the top foil 40 is wound in a cylindrical shape the convex portion 41b passes through the concave portion 42a. Note that in the present embodiment, the widths of the concave portions 42b and 42a are formed to be sufficiently wider than the widths of the corresponding convex portions 41a and 41b. Also, similarly to the first embodiment, the widths of the convex portions 41a and 41b are formed corresponding to the length of the engagement slots described below to substantially agree therewith.

Figure 9A:
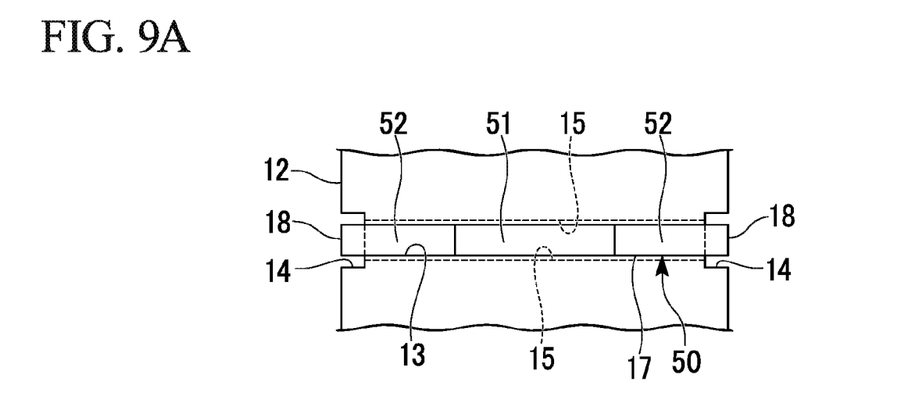
FIG. 9A is a plan view that shows the state of the fitting tool fitted in the through-slot.
Figure 9B:
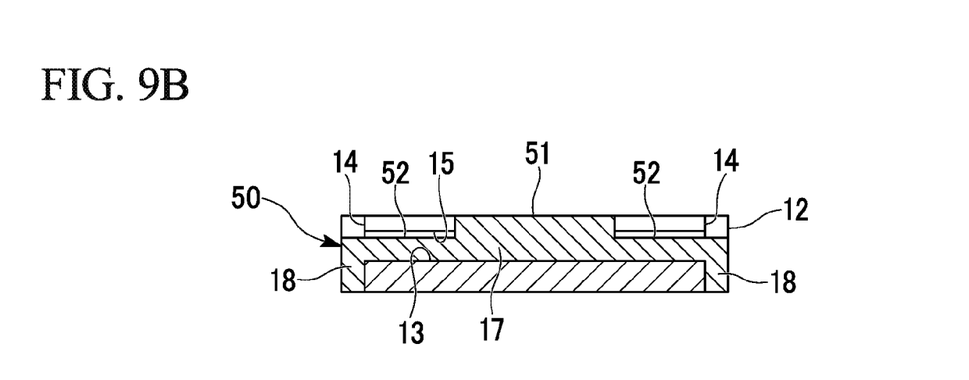
FIG. 9B is a side cross-sectional view that shows the state of the fitting tool fitted in the through-slot.

A fixing tool 50 is fitted and locked as shown in FIG. 9A and FIG. 9B in the through-slot 13 that is formed in the inner circumferential surface of the bearing housing 12. The fixing tool 50 has a bar-shaped (square pole-shaped) base portion 17 that is fitted and housed in the through-slot 13, a pair of bend pieces 18 and 18 that are formed at both end portions of the base portion 17 and that lock into the locking grooves 14 and 14, and one partition portion 51 that is formed in the center portion of the base portion 17 to project to the side opposite the bend pieces 18.

In other words, this fixing tool 50 differs from the fixing tool 16 only on the point of one partition portion 51 being formed, instead of the two partition pieces 19. Accordingly, in the present embodiment, an engagement slot 52 is formed at two locations, one on each side of the partition portion 51 as shown in FIG. 9A and FIG. 9B. Note that the partition portion 51 is formed sufficiently long compared to the partition piece 19, and at the location corresponding to this partition portion 51, an engagement slot is not formed as shown in FIG. 9B. That is, in the present embodiment, the engagement slot 52 is not formed over the entire length of the through-slot 13, with the engagement slot 52 being formed at the positions where the convex portions 41a and 41b shown in FIG. 8A are arranged.

The radial foil bearing having this kind of constitution can obtain the same action effect as the radial foil bearing 3 of the first embodiment. That is, the convex portions 41a and 41b that are drawn out from the concave portions 42b and 42a are engaged in the engagement slots 52 formed by the fixing tool 50 in the through-slot 13 of the inner circumferential surface of the bearing housing 12. For that reason, it is possible to house and fix the top foil 40 in the bearing housing 12 without performing spot welding or bending on the top foil 40, and without a strong reaction force being produced from both end portions toward the center. Accordingly, it is possible to prevent the occurrence of strain in the top foil 40, and so it is possible to sufficiently reduce the strain of the top foil 40. For that reason, with regard to the load capability and the dynamic characteristic (rigidity and attenuation) of the bearing, it is possible to cause it to exhibit as-designed good performance.

Also, since the thin-walled portion 24 is formed at both end portions of the top foil 40, there is no generation of a force that constricts the rotating shaft 1 (local preload) at both ends thereof as described above. Accordingly, it is possible to prevent an increase in the starting torque due to the preload, or the heat generation during operation of the rotating shaft 1 becoming higher than the setting.

Also, when a shift in the axial direction occurs between the top foil 40 and the bearing housing 12, the convex portions 41a and 41b that are engaged with the engagement slots 52 formed by the through-slot 13 being divided in the lengthwise direction are regulated by the end portions of the engagement slots 52 (the partition portion 51). For that reason, due to movement in the axial direction between the top foil 40 and the bearing housing 12 being stopped, it is possible to prevent further shifting. Accordingly, it is possible to reliably prevent the top foil 10 from dropping out from the bearing housing 12.

Note that the present invention is not limited to the aforementioned embodiments, and various modifications are possible within a range that does not depart from the scope of the present invention.

For example, in the embodiments the first uneven portion and the second uneven portion are formed by one or two convex and concave portions respectively, but the number of these convex and concave portions may be three or more.

Also, the thin-walled portion 24 may be formed by for example etching both surfaces to reduce the thickness.

Moreover, the engagement convex portion that is engaged with the engagement notch 11d of the back foil piece 11a may be directly formed on the inner circumferential surface of the bearing housing 12, without being formed by the locking member 30.

Also, the back foil 11 was constituted by the three back foil pieces 11a, but the back foil 11 may be constituted with a single unit in which one metal foil is molded in an approximate cylindrical shape. Moreover, in the case of being constituted with a plurality of back foil pieces 11a, the back foil 11 may be constituted with two or four or more back foil pieces 11a.

Since the radial foil bearing of the present invention prevents the occurrence of strain in the top foil, and sufficiently reduces the strain of the top foil, with regard to the load capability and the dynamic characteristic (rigidity and attenuation) of the bearing, it can obtain as-designed good performance.

Also, forming the through-slot continuously from one end to the other end of the bearing housing simplifies formation of the through-slot, and simply fitting the fixing tool in the through-slot enables formation of a plurality of engagement slots. Therefore, by simplifying the machining, it is possible to sufficiently keep down the machining costs.

The invention claimed is:

1. A radial foil bearing that, by being fitted on a rotating shaft, supports the rotating shaft, comprising:
a cylindrical bearing housing; a cylindrical top foil that is arranged facing the rotating shaft; a back foil that is arranged on the outer side of the top foil in a radial direction of the bearing housing; wherein the bearing housing houses the top foil and the back foil in the state that the top foil and the back foil are inserted in the bearing housing;
wherein a through-slot that is continuous from a first end to a second end along an axial direction is formed in an inner circumferential surface of the bearing housing;
a fixing tool that forms a plurality of engagement slots by dividing the through-slot in a lengthwise direction is fitted in the through-slot;
a regulating portion that regulates the movement of the fixing tool in the lengthwise direction of the through-slot is constituted by locking grooves and a pair of bend pieces, each end of the through-slot having one of the locking grooves to be in communication with the through-slot, and each end of the fixing tool having one of the bend pieces to be locked in the locking groove, the locking grooves being formed in the radial direction of the bearing housing;
the top foil is formed by a metal foil that is rectangular and has a first uneven portion consisting of a convex portion and a concave portion on a first short side, and has a second uneven portion that forms a concave portion at a position corresponding to the convex portion of the first uneven portion and forms a convex portion at at least a portion of the position corresponding to the concave portion of the first uneven portion on a second short side that is opposite the first short side, the rectangular metal foil being wound into a cylindrical shape so that the first uneven portion and the second uneven portion overlap and extend into a respective engagement slot; and the convex portions extending into locking concave portions formed in the through-slot.

2. The radial foil bearing according to claim 1, wherein the first short side and the second short side of the top foil each include a wall portion that is thinner than a central portion of the top foil between the first and second short sides.

3. The radial foil bearing according to claim 2, wherein an outer circumferential surface of each wall portion is recessed from an outer circumferential surface of the central portion.

4. The radial foil bearing according to claim 1, wherein the locking concave portions lock distal end portions of the convex portions and are formed on inner side surfaces of the through-slot along the lengthwise direction of the through-slot.

5. The radial foil bearing according to claim 2, wherein the first short side and the second short side of the top foil each include a wall portion that is thinner than a central portion of the top foil between the first and second short sides.

6. The radial foil bearing according to claim 5, wherein an outer circumferential surface of each wall portion is recessed from an outer circumferential surface of the central portion.

* * * * *